United States Patent [19]

Ohma

[11] Patent Number: 4,493,490
[45] Date of Patent: Jan. 15, 1985

[54] FRONT FORK FOR CYCLE

[75] Inventor: Toshio Ohma, Fukuroi, Japan

[73] Assignee: Showa Manufacturing Co., Ltd., Tokyo, Japan

[21] Appl. No.: 433,710

[22] Filed: Oct. 12, 1982

[30] Foreign Application Priority Data

Dec. 28, 1981 [JP] Japan .............. 56-198917[U]

[51] Int. Cl.³ ............................................ B62K 25/06
[52] U.S. Cl. ............................... 280/276; 188/322.17; 277/32
[58] Field of Search ............... 280/276, 284, 274, 277; 277/152, 58, 124, 32; 188/322.17

[56] References Cited

U.S. PATENT DOCUMENTS

| 4,012,055 | 3/1977 | Ottow | 280/276 |
| 4,147,371 | 4/1979 | Morita et al. | 280/276 |
| 4,166,523 | 9/1979 | Fujii et al. | 188/322.17 |
| 4,348,016 | 9/1982 | Milly | 280/284 |
| 4,359,228 | 11/1982 | Cather | 277/32 |

*Primary Examiner*—David M. Mitchell
*Assistant Examiner*—Donn McGiehan
*Attorney, Agent, or Firm*—A. W. Breiner

[57] ABSTRACT

A front fork including an outer cylinder 2 and a slidable inner cylinder 3 with working oil between them has a dust seal 5 and an oil seal 6 in sliding contact with the outer circumference of the inner cylinder. Between these seals there is a guide 7 which is also in sliding contact with the outer circumference of the inner cylinder and which is made of sponge or felt and is impregnated with grease or oil. The provision of this guide increases the lives of the other seals.

6 Claims, 2 Drawing Figures

U.S. Patent  Jan. 15, 1985  4,493,490
FIG.1
FIG.2
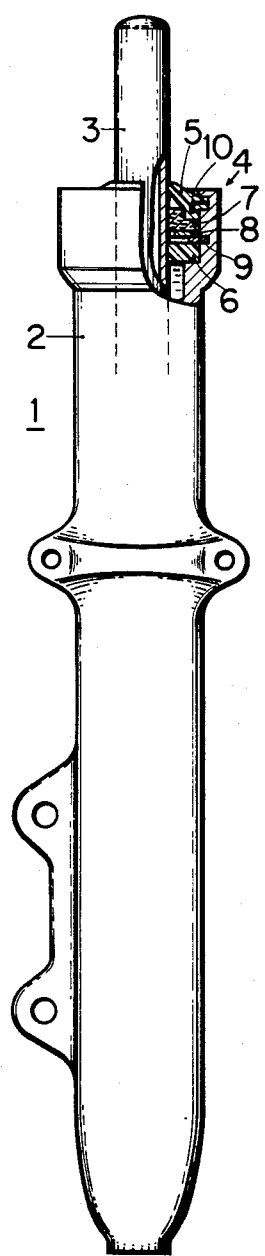
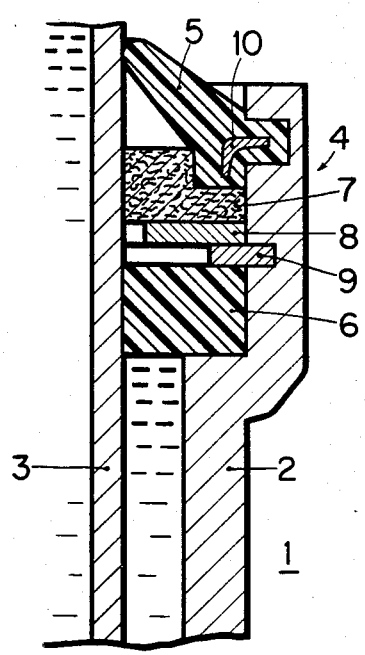

FRONT FORK FOR CYCLE

This invention relates to sealing devices for hydraulic shock absorbers to be used as the front forks of cycles.

Such hydraulic shock absorbers are filled up with working oil so as to exert a shock-absorbing action upon the wheel of the cycle as a result of the damping force which is established by the sliding of an inner cylinder within an outer cylinder. In a hydraulic shock absorber which is disclosed, for example, in Japanese Utility Model No.: 40622/81 published on Sept. 22, 1981, there is fitted in the head portion of the outer cylinder a sealing device which is to slide on the outer circumference of the inner cylinder. The sealing device thus disclosed is constructed of a dust seal for preventing dust or the like from sticking to the outer circumference of the inner cylinder and an oil seal for preventing the oil confined in the outer cylinder from wetting the surface of the inner cylinder and flowing to the outside.

In order to improve the operation of the sealing device, therefore, it is necessary to increase the force exerted by the seal in its sliding contact with the outer circumference of the inner cylinder. As against this, however, this increase of the force adversely affects the sliding characteristics of the inner cylinder. For this reason, therefore, the sliding characteristics of the inner cylinder have previously been improved by applying grease or the like to the sealing portion thereof. It is, however, difficult for the grease or the like to maintain its lubricating action for any length of time. As the grease is consumed with continuing use, the friction resistance between the inner and outer cylinders grows appreciably larger during the sliding movements of the inner and outer cylinders with the results that the sliding characteristics may be impaired and that the durability of the sealing portion may sometimes be reduced.

It is therefore an object of the present invention to provide a sealing device which is capable of maintaining a good seal without leading to problems of lubrication.

Thus, according to the invention, a front fork for a cycle, including an inner cylinder fitted slidably in an outer cylinder with a dust seal and an oil seal forming a sliding fit with the outer circumference of the inner cylinder and fitted in the head portion of the outer cylinder also includes a sealing device in the form of a guide interposed between the dust seal and the oil seal so as to slide on the outer circumference of the inner cylinder and impregnated with a lubricant. The inclusion of the impregnated guide ensures adequate lubrication at all times.

An example of construction according to the invention will now be described, with reference to the accompanying drawings, in which:

FIG. 1 is a partially broken away side elevation showing a front fork including the improved arrangement; and FIG. 2 is an enlarged sectional view showing a portion of FIG. 1.

The sealing device which constitutes the novel feature of the invention is shown as 4 and is used in conjunction with a hydraulic shock absorber 1 forming part of a front fork for a cycle. The device includes dust and oil seals 5 and 6 made of synthetic rubber or the like, which have their outer circumferences fitted in the head portion of an outer cylinder 2 and their inner circumferences sliding on the outer circumference of an inner cylinder 3, the dust seal 5 being prevented from deformation by a reinforcing band 10.

The novel feature according to the invention lies in the inclusion of a guide 7 made of an oil-less material such as sponge or felt, between the dust and oil seals 5 and 6. This guide 7 has its inner circumference sliding on the outer circumference of the inner cylinder 3 and its outer circumference held through a supporting ring 8 by means of a circlip 9 such that it is fixed in the outer cylinder 2, and is impregnated with a lubricant such as grease or oil.

As a result, the inner and outer cylinders have their sliding faces lubricated at all times by the action of the guide which is impregnated with the grease or oil, so that the friction between them is reduced. This makes it possible to improve the durability of the dust and oil seals and to ensure smooth operation of the hydraulic shock absorber for long periods of time.

I claim:

1. A front fork for a cycle, including an inner cylinder fitted slidably in an outer cylinder with a dust seal and an oil seal forming a sliding fit with the outer circumference of the inner cylinder and fitted in the head portion of the outer cylinder and also including a lubricating device in the form of a guide interposed between the dust seal and the oil seal so as to slide on the outer circumference of the inner cylinder and impregnated with a lubricant.

2. A front fork according to claim 1 wherein the lubricant is grease or oil.

3. A front fork according to claim 1 or claim 2 wherein the guide is made of an oil-less material.

4. A front fork according to claim 3 wherein the material is sponge or felt.

5. A front fork according to claim 1 wherein the guide is fixed to the outer cylinder through a supporting ring by means of a circlip.

6. A front fork according to claim 1, wherein a reinforcing band is embedded in the dust seal.

* * * * *